(12) United States Patent
Wiese

(10) Patent No.: US 6,415,661 B1
(45) Date of Patent: Jul. 9, 2002

(54) ASCERTAINING INFORMATION FOR COMPENSATING AN UNBALANCE OF ELASTIC ROTORS

(75) Inventor: Dietmar Wiese, Rossdorf (DE)

(73) Assignee: Schenck RoTec GmbH, Darmstadt (DE)

( * ) Notice: Subject to any disclaimer, the term of this patent is extended or adjusted under 35 U.S.C. 154(b) by 0 days.

(21) Appl. No.: 09/285,193

(22) Filed: Mar. 15, 1999

(30) Foreign Application Priority Data

Mar. 13, 1998 (DE) .......................................... 198 11 101

(51) Int. Cl.⁷ .............................. G01M 1/16; G01M 1/22
(52) U.S. Cl. ............................................ 73/462; 73/660
(58) Field of Search ........................ 73/462, 660, 661, 73/593, 602, 460; 702/33, 43

(56) References Cited

U.S. PATENT DOCUMENTS

| 4,098,127 A | * | 7/1978 | Shiga et al. .................... 73/462 |
| 4,448,077 A | * | 5/1984 | Sato et al. ..................... 73/660 |
| 4,607,529 A | | 8/1986 | Morey |
| 4,783,998 A | | 11/1988 | Sander |
| 5,008,826 A | | 4/1991 | Staudinger et al. |
| 5,138,884 A | | 8/1992 | Bonavia |
| 5,396,436 A | | 3/1995 | Parker et al. |
| 5,421,199 A | * | 6/1995 | Himmler ....................... 73/462 |

FOREIGN PATENT DOCUMENTS

| DE | 4133787 | | 4/1993 |
| EP | 0141013 | | 5/1985 |
| EP | 0327026 | | 8/1989 |
| EP | 0740141 | | 10/1996 |
| JP | 54-150183 | * | 11/1979 |
| JP | 57-9342 | * | 1/1982 |
| JP | 2-173540 | * | 7/1990 |
| WO | WO 93/07458 | | 4/1993 |

OTHER PUBLICATIONS

K. Federn entitled "Overview Over Current Approaches, Guidelines, Standards, and Customary Methods for Balancing Wave Elastic Rotors", VDI–Reports No. 161, 1971, pp. 5 to 12.
Textbook by W. Kellenberger, "Elastic Balancing", Berlin, 1987, pp. 317 to 325.
A report by R. Gasch and J. Dreschler, entitled "Modal Balancing of Elastic Rotors Without Applying Testing Weights", VDI–Reports No. 320, 1978, pp. 45 to 53.
International Standard ISO#1925, Third Edition "Mechanical Vibration–Balancing–Vocabulary", pp. 14, 15, 19, 20, 24, 25 and 26.

* cited by examiner

Primary Examiner—Helen Kwok
(74) Attorney, Agent, or Firm—W. F. Fasse; W. G. Fasse

(57) ABSTRACT

Rotors, especially elastic rotors, are balanced by measuring unbalance values which provide information regarding the size, or rather the weight of balancing weights and the angular location where these balancing weights are to be secured to the rotor. For obtaining balancing weights an excitation force is applied to the rotor which is at a standstill or which may, but does not have to, rotate when the excitation force is applied by a hammer (11), equipped with a sensor (S) and an output (11A) to provide excitation force spectra. Further sensors (7, 8) are positioned in bearing planes ($ME_1$, $ME_2$) and provide response force spectra. The excitation force spectra and the response force spectra due to the rotating unbalanced rotor are then processed to obtain the unbalance compensating values required for the balancing operation.

23 Claims, 1 Drawing Sheet

$\Omega_B$ = MAX. OPERATION ANGULAR FREQUENCY

ASCERTAINING INFORMATION FOR COMPENSATING AN UNBALANCE OF ELASTIC ROTORS

PRIORITY CLAIM

This application is based on and claims the priority under 35 U.S.C. §119 of German Patent Application 198 11 101.0, filed on Mar. 13, 1998, the entire disclosure of which is incorporated herein by reference.

FIELD OF THE INVENTION

The invention relates to balancing of flexible rotors, more specifically, to ascertaining unbalance compensating values that represent an unbalance of an elastic rotor and are required for an unbalance compensation of the elastic rotor. The invention further relates to ascertaining coefficients which have an influence on the balancing of unbalanced elastic rotors, which normally have a rigid behavior in a low r.p.m. range.

BACKGROUND INFORMATION

In order to balance rigid rotors having a simple cylindrical shape and rotating at a low r.p.m., it is customary to measure the resulting unbalance of all individual unbalances generally in the left bearing or support plane and in the right bearing or support plane. If a balancing is necessary, the measured resultant of the unbalances are compensated in two balancing planes. The balancing planes define locations around the rotor where balancing weights are to be applied. As a result of the compensation by the attachment of balancing weights, a rigid rotor rotates free of vibrations otherwise caused by an unbalance and free of bearing forces. Generally, non-symmetric masses are distributed over the entire length of a rotor. As a result, internal bending moments remain in the rotor due to centrifugal forces produced by individual unbalances. In connection with elastic rotors, such internal bending moments can cause forces that rise with the square of the r.p.m., thereby leading to unpermissibly large deformations which in turn cause unbalance effects. This fact can cause a dangerous situation, especially when the operational r.p.m. approaches a bending critical r.p.m. which could without damping cause an infinitely large bending or a permanent deformation of the rotor.

Theoretically, a rotor or a shaft has infinitely many critical r.p.m.s. In order to evaluate or judge the vibration characteristic at a definite r.p.m. only those critical r.p.m.s are taken into account which cause corresponding bending configurations or "modal shapes" that become troublesome. With regard to practical considerations, frequently it is sufficient for many rotor types to take but one critical r.p.m. into account which excites a rotor to assume a wave elasticity. However, under certain circumstances it may be necessary to take several critical r.p.m.s into account. A simple roller shaped or cylindrical rotor will bend in the shape of a U when approaching the first critical r.p.m. Such a simply rotor will bend into an S-configuration when approaching the second critical r.p.m. Such a simple rotor will bend into a W-configuration when approaching the third critical r.p.m. These bending configurations at critical r.p.m.s are referred to as "modal shapes" of the rotor.

One must count on the occurrence of elastical deformations the more so the higher the operational r.p.m. is. Thus, it is the aim of a balancing operation to reduce unbalance forces to a tolerable level over the entire permissible operational r.p.m. range. Such unbalance forces involve rigid body forces and forces caused by the wave elastic deformation or deflection of the rotor. These forces must be reduced to a tolerable level by the balancing operation or unbalance compensation. In practice, there are known several balancing methods which take into account such wave elastic characteristics of rotors.

One such method has become known from an article by K. Federn entitled "Overview Over Current Approaches, Guidelines, Standards, and Customary Methods for Balancing Wave Elastic Rotors", VDI-Reports No. 161, 1971, pages 5 to 12. The just mentioned article describes a balancing in a plurality of measuring or sensing planes with a compensation in n+2 balancing or compensation planes. The balancing itself may be performed manually by applying the required balancing weights. In this connection it is necessary to perform a balancing operation in at least n+2 compensating or balancing planes if n-critical r.p.m.s are taken into account. According to Federn, first a conventional rigid body balancing operation is performed. Only then modal unbalances are eliminated with the aid of generally several test load sequences or test load runs. Such methods rely heavily on the experience and dexterity of the operator which effect the number of balancing sequences or runs required in order to achieve an optimal running characteristic at the operational r.p.m. of the rotor after the unbalance compensation is completed. As a rule, however, there are always a larger number of measuring sequence or runs required in order to achieve a good balancing result.

A textbook by W. Kellenberger, "Elastic Balancing", Berlin, 1987, pages 317 to 325, describes a computer aided balancing method with test loads or test weights applied to the rotor sample for ascertaining influence coefficients. The Kellenberger method eliminates or at least reduces the rigid body compensation and the wave elastic bending by compensation masses calculated in common for both types of deformations. For performing the method, an initial unbalance measuring sequence or test run is performed, whereupon at least as many further unbalance measuring sequences or test runs with test weights are required as balancing planes are provided. Thus, at least four unbalance measuring sequences are required when considering the first critical r.p.m. of the rotor to be balanced. According to the Kellenberger method the influence coefficients that are measured in the several measuring sequences with testing weights, are stored in the memory of the computer. Hence, these influence coefficients can be used for subsequent testing of the same type of rotors under favorable circumstances so that only one unbalance measuring sequence needs to be performed. In any event, for all first time balancing operations of rotors, these rotors must be loaded with testing weights and the number of measuring runs with testing weights must correspond to the number of compensation or balancing planes that are to be taken into account.

A report by R. Gasch and J. Drechsler, entitled "Modal Balancing of Elastic Rotors Without Applying Testing Weights", VDI-Reports No. 320, 1978, pages 45 to 53, describes a method that ascertains the required compensating or balancing masses without the above described testing weight measuring sequences in order to compensate for wave elastic deflections of the rotor. Gasch et al. suggest to first perform a rigid body balancing followed by an unbalance measuring sequence all the way into the critical r.p.m. ranges that must be taken into account and to thereby measure the rotor deflections with the aid of displacement pick-ups positioned at predetermined rotor locations. With the aid of the stored or registered elastic deflections of the rotor shaft and with the knowledge of the modal shape and the corresponding generalized masses, it is possible to identify, computer aided, modal unbalance components and to calculate respective compensating weights. Such a method has the disadvantage that first a conventional rigid body compensation must be performed and only thereafter it is possible to eliminate modal unbalances by additional measuring and compensating processes.

German Patent Publication DE 4,133,787 A1 discloses another balancing method for elastic rotors, wherein the compensation masses required for balancing are ascertained without the use of measuring sequences with testing weights, for compensating rigid body unbalances and wave elastic deflections of the rotor. The rotor to be balanced is first run for one unbalance measurement at an r.p.m. at which the rotor exhibits rigid body characteristics, whereby first at least one unbalance measured value is obtained. Then, at least one further unbalance measured value is obtained for each support or bearing plane and for each modal shape to be compensated. The further measurement is made at an r.p.m. in the range of the inherent modal shape r.p.m. that must be taken into account. The so ascertained unbalance measured values are then processed in an evaluating computer which also takes into account rotor specific and/or bearing specific data for obtaining the mass or masses required for compensating the rigid body unbalance and the modal shape proportion to be taken into account in the balancing operation. The evaluating computer calculates a so-called force fingerprint for each bearing plane, whereby this force fingerprint is a constant value independent of the particular r.p.m. This force fingerprint provides information on the unbalance effect of the elastic rotor characteristic. The method of the just mentioned German Patent Publication 4,133,787 A1 requires providing, for example, through a keyboard, to the evaluating computer information regarding rotor specific data, bearing specific data such as dimensions, configurations, and the type of material of which the rotor to be balanced is made.

OBJECTS OF THE INVENTION

In view of the foregoing it is the aim of the invention to achieve the following objects singly or in combination:

to provide a method for ascertaining information for the compensation of an unbalance in elastical rotors without the use of testing weights and substantially without the use of the rotor specific and bearing specific data mentioned above;

to avoid the separate ascertaining of rotor specific and bearing specific data;

to provide a method that permits a rapid balancing of elastic rotors based on values measured on the rotor and on calculated informations necessary for the balancing; and to provide a testing method that can measure the effects of force applications when the rotor is in a standstill or when the rotor is rotating.

SUMMARY OF THE INVENTION

The inventor has recognized that it is possible to completely determine all influence coefficients that are required for a balancing operation also referred to herein as unbalance compensation if the rotor in question is excited by a force application in several compensation or balancing planes. By taking into account influence coefficients related to force excitation which are then transformed into unbalance influence coefficients by calculation and by a single unbalance run made to measure unbalance effects one can ascertain the unbalance compensating values without the need for taking into account specific system characteristics such as rotor specific data and bearing specific data. By using these calculated unbalance influence coefficients a balancing operation or unbalance compensation can be performed in a most simple manner by determining the required unbalance compensating weights on the basis of said coefficients and a single unbalance run.

According to the invention, there is provided a method for obtaining unbalance compensating values from a rotor having a rotation axis and an r.p.m. dependent elastic or rigid behavior, for balancing said rotor, said method comprising the following steps:

a) mounting said rotor in at least two bearing planes for rotating said rotor about said rotation axis, b) determining a number of balancing planes required by said rotor and a number of modal shapes at which said rotor is to be balanced, c) applying an excitation force to said rotor transversely to said rotation axis in each of said balancing planes for inducing in said rotor a vibration pattern, d) sensing an excitation force spectrum or spectra caused by said excitation force that induced said vibration pattern, e) picking-up a rotor specific response spectrum or spectra, f) calculating ratios of said response spectrum or spectra to said excitation force spectrum or spectra for forming force influence coefficients ($EFK_F$) resulting from said excitation force, g) forming unbalance influence coefficients ($EFK_U$) from said force influence coefficients ($EFK_F$), h) performing a measuring sequence for measuring rotor r.p.m. signals and rotor specific signals, i) correlating said rotor specific signals to respective rotor r.p.m. signals for producing r.p.m. correlated rotor specific signals, and j) calculating said unbalance compensating values from said r.p.m. correlated rotor specific signals and from said unbalance influence coefficients ($EFK_U$). The above mentioned excitation force may be applied manually by a hammer blow or blows in one or more excitation planes, preferably when the rotor is at a standstill.

According to the invention there is further provided a method for obtaining unbalance influence coefficients for balancing a rotor having a rotation axis and an r.p.m. dependent elastic or rigid behavior, said method comprising the following steps:

a) mounting said rotor in at least two bearing planes for rotating said rotor about said rotation axis, b) determining a number of balancing planes required by said rotor and a number of modal shapes at which said rotor is to be balanced, c) applying an excitation force to said rotor transversely to said rotation axis in each of said balancing planes for inducing in said rotor a vibration pattern, d) sensing an excitation force spectrum or spectra caused by said excitation force that induced said vibration pattern, e) picking-up a rotor specific response spectrum or spectra, and f) calculating ratios of said response spectrum or response spectra to said excitation force spectrum or spectra to form said unbalance influence coefficients by transformation. Here, the excitation force is also applied manually by a hammer blow or blows, preferably when the rotor is not rotating.

The invention makes it possible for the first time to ascertain the influence coefficients for obtaining or calculating balancing weights by simple measurements without first ascertaining data for the entire balancing system such as the above rotor and bearing specific data. Computer processing of these system data is also avoided. The influence coefficients are simply measured, processed in a computer for transformation and then used for ascertaining the balancing weights required for a balancing operation or unbalance compensation. A special advantage of the invention is seen in that the force application for exciting the rotor can be made either while the rotor is at a standstill or while the rotor rotates. Another advantage is seen in that several test runs with different testing weights applied to the rotor are no longer necessary.

BRIEF DESCRIPTION OF THE DRAWINGS

In order that the invention may be clearly understood it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
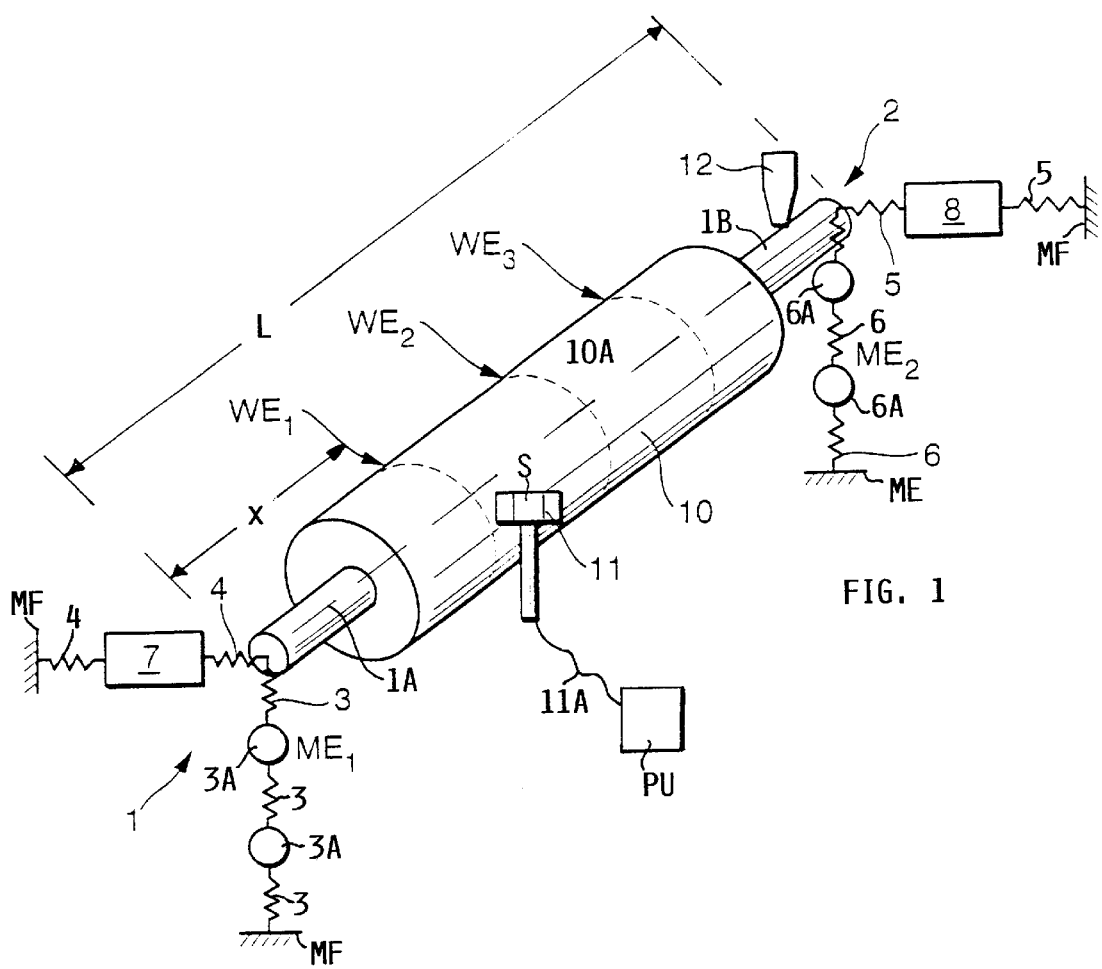
FIG. 1 is a perspective view of a system for measuring an unbalance of an elastic rotor with schematically illustrated sensors and rotor mountings.

FIG. 1 shows schematically a system for measuring the unbalances of a rotor 10. Details of the rotor support and its drive are not part of the invention. However, such details are shown in "International Standard ISO#1925, Third Edition "Mechanical Vibration-Balancing-Vocabulary", pages 14, 15, 19, 20, 24, 25 and 26 incorporated herein by reference. A first mounting 1 holds or supports one end 1A of a rotor shaft. A second mounting 2 holds the other end 1B of the shaft of the rotor 10. These supports 1 and 2 are, for example, constructed as conventional rocking bridge bearings as used in force or displacement measuring balancing machines. These supports or bearings 1 and 2 are supported against a machine frame MF. The first support 1 is formed by springs 3 and masses 3A providing a vertical support in a first measuring plane $ME_1$. Springs 4 provide a horizontal support in the plane $ME_1$. The springs 3 and 4 and the masses 3A form a first spring mass system, whereas the symbol 7 for the pickup represents masses, springs and the pickup itself. The second support or bearing 2 is formed by horizontally effective springs 5 and vertically positioned springs 6 and masses 6A. The elements 5, 6 and 6A form a second spring mass system, whereas the symbol 8 for the pickup represents masses, springs and the pickup itself.

In force measuring balancing machines it is conventional to measure vibrations by pickups or force sensors. In so-called displacement measuring balancing machines vibration displacement pickups or vibration velocity pickups are used.

In FIG. 1 a first pickup 7, such as a force pick-up is arranged in the first measuring plane $ME_1$. A second pickup 8, such as a force pickup, is arranged in the second measuring plane $ME_2$. Both pickups 7 and 8 are positioned to be effective in a measuring direction extending horizontally and perpendicularly to the rotational axis 10A of the rotor 10. An r.p.m. sensor 12 is positioned to measure the r.p.m. of the rotor 10 and to provide a respective r.p.m. signal. Any conventional drive can be used for rotating the rotor 10. Such drives are illustrated in the above mentioned ISO#1925. Instead of measuring the r.p.m. with a separate sensor 12, it is possible to use a drive motor which itself is provided with an r.p.m. measuring device that provides the required r.p.m. signal. Furthermore, such conventional drives may be so constructed to operate with a fixed or constant r.p.m. or can be adjusted to maintain a required constant r.p.m.

As shown, the rotor 10 with its shaft ends 1A and 1B is arranged substantially symmetrically relative to the measuring planes $ME_1$ and $ME_2$. In this example embodiment only the wave elastic characteristic of the first modal shape (eigenform) of the rotor shall be taken into account and compensated. For this purpose it is sufficient to use but three compensation planes $WE_1$, $WE_2$, and $WE_3$, which are also excitation force application planes. For taking into account n number of modal shapes it is common to provide n+2 compensation planes. In a lot of practical cases it is sufficient to take only up to the first three modal shapes into account for practical balancing because it has been found that unbalance effects of further modal shapes can be disregarded.

FIG. 1 further shows a hammer 11 for applying in each compensation plane an excitation force in the form of a hammer blow to the rotor 10 when it is not rotating or when it is rotating. The excitation force or blow is applied in the compensation or excitation planes $WE_1$, $WE_2$ and $WE_3$, in the measuring direction which normally extends transversely to the rotational axis 10A of the rotor 10. The hammer 11 is provided with an acceleration sensor S which generates signals of the forces applied by the hammer 11 to the rotor 10 and these signals are supplied through a cable 11A to a signal processing unit PU. The processing unit PU also receives signals from the sensors 7 and 8 and from the r.p.m. sensor 12. The signal from the hammer 11 provides a curve or spectrum representing the excitation force as a function of time so that one excitation spectrum for each compensation or unbalance plane $WE_1$, $WE_2$ and $WE_3$ is formed. Hammers with built-in sensors are conventional and sold for example by Schenck Vibro GmbH of Darmstadt, Germany.

When the rotor 10 is at a standstill and a hammer blow is applied in the planes $WE_1$, $WE_2$, or $WE_3$, the following phenomena can be measured. Shaft vibrations, support velocities, support accelerations and so forth. These phenomena also result from unbalance excitation. In the present example the following text will take into account those forces which are effective in or on the support or bearing planes 1 and 2, for example of a balancing machine. In the present example, these bearing or support planes 1 and 2 coincide with measuring planes $ME_1$, $ME_2$, respectively.

The sensors 7 and 8 provide for the respective bearing plane 1 or 2 the curves of the forces that are effective in the bearings as a function of time, and more specifically as a function of frequency by using Fourier Analysis Method. For each bearing plane and for each hammer blow one force spectrum can be measured. In the example three complex spectra are measured for each bearing plane $ME_1$, or $ME_2$ due to the excitation in the three excitation or compensation planes $WE_1$, $WE_2$ and $WE_3$. For example, a total of six force spectra will be measured and processed in the processing unit PU.

The forces caused by unbalance that are measured by the sensors 7 and 8 in the support planes 1 and 2 respectively are defined by the following equations, wherein $F_{1U}{}^{ges}$ relates to all unbalance force spectra measured in the first support plane and $F_{2U}{}^{ges}$ relates to all unbalance force spectra measured in the second support plane 2, both resulting from a single unbalance excitation placed at axial location x. $F_{1F}{}^{ges}$ relates to all force spectra measured in the first support plane 1 and caused by a single force excitation applied at the axial location x, $F_{2F}{}^{ges}$ to those measured in the second support plane 2. All symbols used herein will be defined in a list at the end of the description.

$$F_{1U}ges(\Omega) = U\Omega^2 \cdot \frac{L-x}{L} + \sum_i \frac{\Omega^2}{\omega_{i2} - \Omega^2 + j2\delta_i\Omega} \cdot U\Omega^2 \frac{\varphi_i(x)m_1^{ei}}{m_{geni}} \quad \text{Equation (1)}$$

$$F_{2U}ges(\Omega) = U\Omega^2 \cdot \frac{x}{L} + \sum_i \frac{\Omega^2}{\omega_{i2} - \Omega^2 + j2\delta_i\Omega} \cdot U\Omega^2 \frac{\varphi_i(x)m_2^{ei}}{m_{geni}} \quad \text{Equation (2)}$$

In case the force excitation is performed with a force F of constant size applied at axial location x, the following equations apply.

$$F_{1F}ges(\Omega) = F \cdot \frac{L-x}{L} + \sum_i \frac{\Omega^2}{\omega_{i2} - \Omega^2 + j2\delta_i\Omega} \cdot F \cdot \frac{\varphi_i(x)m_1^{ei}}{m_{geni}} \quad \text{Equation (3)}$$

$$F_{2F}ges(\Omega) = F \cdot \frac{x}{L} + \sum_i \frac{\Omega^2}{\omega_{i2} - \Omega^2 + j2\delta_i\Omega} \cdot F \frac{\varphi_i(x)m_2^{ei}}{m_{geni}} \quad \text{Equation (4)}$$

If one divides the forces measured by the sensors 7, 8 in the measuring planes $ME_1$, $ME_2$, or rather the spectra of these forces, by the spectra of the input forces caused by a hammer blow and measured by the sensor S in the hammer 11, one obtains the respective influence coefficients as follows. This division represents a ratio of output measured by sensors 7 and 8 divided by input measured by sensor S.

Unbalance influence coefficients $$EFK_1 U^{ges}\Omega = F_1 U^{ges}\frac{(\Omega)}{U} \quad \text{Equation (5)}$$

$$EFK_2 U^{ges}\Omega = F_2 U^{ges}\frac{(\Omega)}{U} \quad \text{Equation (6)}$$

Force influence coefficients $$EFK_1 F^{ges}\Omega = F_1 F^{ges}\frac{(\Omega)}{F} \quad \text{Equation (7)}$$

$$EFK_2 F^{ges}\Omega = F_2 F^{ges}\frac{(\Omega)}{F} \quad \text{Equation (8)}$$

Based on the three complex excitation force spectra and the six complex bearing force spectra in the above example, it is possible to derive force influence coefficients $EFK_F$ by using a complex matrix $\alpha_{ij}^F(n)$. The definition of the terms in the matrix are listed at the end of the description.

It is necessary to transform force influence coefficients $EFK_F$ into unbalance influence coefficients $EFK_U$, in different ways, depending on whether the rotor behavior differs between a standstill or rotation.

Practically the same rotor behavior is present for a rotating rotor and a non-rotating rotor for all practical purposes in connection with roller shaped cylindrical rotors such as paper rollers which are balanced on conventional force measuring balancing machines. For such rotors the balancing is performed to just below the first critical r.p.m. The first natural frequency and the first modal damping degree are practically undistinguishable for standstill measurements and rotation measurements. The same holds true for the first modal shape. Gyroscopic effects can be disregarded as being insignificantly small.

The force influence coefficients $EFK_F$ or $\alpha_{ij}^F$ which result from a force input excitation by hammer blows relate to the unbalance influence coefficients $EFK_U$ or $\alpha_{ij}^U$, in case of same behavior when the rotor is at a standstill and when it is rotated as follows.

$$\alpha_{ij}U = \Omega^2 \alpha_{ij}F \quad \text{Equation (9)}$$

If we substitute in $\alpha_{ij}^U = \underline{A}$, and with $\underline{A} \cdot \vec{U} = -\vec{F}$ for $F_{ME1}(n_1)$, $F_{ME1}(n_2)$, $F_{ME1}(n_3)$
$F_{ME2}(n_1)$, $F_{ME2}(n_2)$, $F_{ME2}(n_3)$ forces measured during unbalance measuring run at the three different r.p.m.s $n_1$, $n_2$, $n_3$ in the left bearing or measuring plane $ME_1$ and in the right bearing or measuring plane $ME_2$ we obtain, by applying $\underline{A} \cdot \vec{U} = -\vec{F}$ for $\underline{A}$ the solution method of the least error square sum.

$$[\underline{A}^{*T} \underline{A}]U = -[\underline{A}^{*T}F] \quad \text{Equation (10)}$$

Solving Equation 10 for U one obtains $$U = [\underline{A}^{*T} \cdot F] \cdot [\underline{A}^{*T} \cdot \underline{A}]^{-1} \quad \text{Equation (11)}$$

which defines the size and angular position of the compensation unbalance U. All terms are defined in the list shown below.

If the behavior for the rotating rotor differs from the behavior for the nonrotating rotor as it is practically always the case for rotors mounted in slide bearings, the present method must be modified, because the conditions vary for rotors mounted in slide bearings, for example due to the r.p.m. dependent characteristics of the oil film in the slide bearing and possible gyroscopic effects. As a result of these factors, different natural frequencies and respective modal damping grades are measured when the rotor is at a standstill and when it is rotating.

Figure 2:
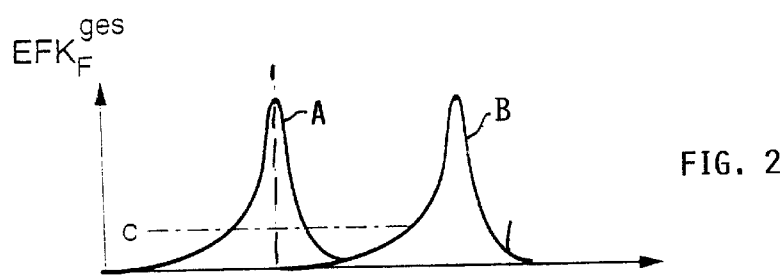
FIG. 2 shows a characteristic curve of force influence coefficients as a function of the operation angular frequency when the rotor is not rotating.

The required modification will now be discussed with reference to FIGS. 2 and 3. FIG. 2 illustrates the force coefficients $EFK_F{}^{ges}$ as a function of $\Omega$ when the rotor is at a standstill and excitation is accomplished, for example by a hammer blow in the several excitation or balancing planes $WE_1$, $WE_2$ and $WE_3$. The curves A and B represent relevant modal measurement contributions while the horizontal line C represents a constant contribution due to a static force (applied with angular frequency $\Omega$=O).

Figure 3:
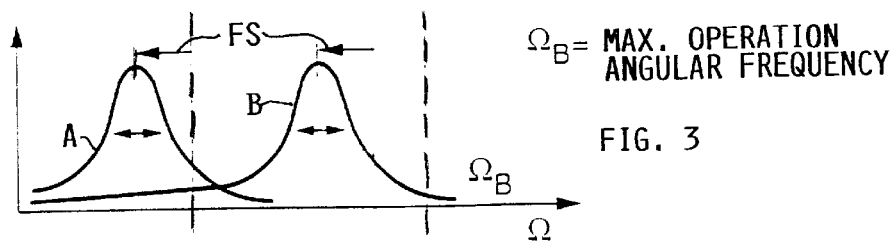
FIG. 3 is an illustration as in FIG. 2, but when the rotor is rotating.

FIG. 3 shows the run-up curves of the rotor when it rotates. In both instances in FIGS. 2 and 3 the abscissa represents $\Omega$, namely the angular frequency in radians per second (rad/sec). By comparing the curves of FIG. 2 with the curves of FIG. 3 it is seen that the modal contributions have shifted in frequency and that different modal damping degrees are present. The peaks in FIG. 2 are higher than the peaks in FIG. 3, indicating different modal damping degrees.

It is possible, for example by methods of modal analysis to identify the parameters $\omega_i$ and $\delta_i$, and the constants $$\frac{\varphi_i(x)m_{1/2}^{ei}}{m_{geni}} \qquad \text{Equation (12)}$$

for the modal contributions A and B to the curve of $EFK_F$ ($\Omega$). The values for $\omega_i$, and $\delta_i$, which are derived from a force excitation when the rotor is not rotating, can be replaced by the natural or resonance frequencies $\omega_i$ and modal decay constants $\delta_i$ when the rotor is rotating and runs up to the rated r.p.m. or when the rotor is rotating at a measuring r.p.m. for measuring an unbalance. These values for a rotating rotor are derived by modal analysis. Software is available for example under the tradename Msys provided by the firm Maul-Theet of Berlin, Federal Republic of Germany for performing such modal analysis.

If now a summation is made of the constant contribution and the relevant modal components or contributions while taking into account the resonance frequencies $\omega_i$ and the modal decay constants $\delta_i$ ascertained during run-up measurements or during an unbalance measuring run and if then the result of the summation is multiplied by $\Omega^2$, one obtains an approximation for the $EFK_U$, when an unbalance excitation takes place.

For this purpose, for example the Equation (3) for the force measurement in the first measurement plane $ME_1$ would be modified for obtaining the unbalance influence coefficient $EFK_U^{ges}$ as follows.

$$EFK_{1Uges}(\Omega) = \Omega^2 \cdot \frac{L-x}{L} + \qquad \text{Equation (13)}$$

$$\sum_{i=a,b} \frac{\Omega^2}{\omega_{i2} - \Omega^2 + j2\delta_i\Omega} \cdot \frac{\varphi_i(x)m_1^{ei}}{m_{geni}}$$

In Equation (13) the first summand in the parenthesis is derived from the $EFK_f^{ges}$ ($\Omega$) curve resulting from an excitation force application by the hammer 11 when the rotor does not rotate. The last term in the second summand within the parenthesis is obtained by modal analysis following an excitation force application when the rotor is not rotating and the values $\omega_i$ and $\delta_i$ are representative of a run-up of the rotor or when the rotor rotates during an unbalance measurement. Equation 13 represents an approximation, because higher modal contributions are disregarded.

The following steps are performed for obtaining the unbalance compensating values necessary for performing a balancing operation on the basis of such information.

Step 1

The rotor is stationary n=0 r.p.m. Applying a hammer blow to the rotor in an excitation or balancing plane $WE_1$, $WE_2$ or $WE_3$. The sensor S in the hammer 11 provides signals representing an excitation force spectrum or spectra providing an input. The sensors 7 and 8 measure output signals representing a bearing force spectrum in the left bearing plane $ME_1$ and in the right bearing plane $ME_2$. The excitation (input) and the response (output) take place in a horizontal direction. The sensors 7 and 8 are arranged for sensing in such horizontal direction. The force excitation in the horizontal direction when the rotor is not rotating provides a vibration motion in the horizontal direction. The respective signal corresponds in its size to a virtual or fictitious excitation that would be circumferentially effective. Thus, it is an advantage of the invention to take measurements without even rotating the rotor. Rotating the rotor is rather time consuming for certain rotors because substantial time may elapse before the rotors reach their rated speed.

Step 2

Ascertaining from the force spectra $ME_i$ and $WE_j$ the force influence coefficient $EFK_F = \alpha_{ij}^F(n)$.

Step 3

The force influence coefficient EFK, is now calculated in the processing unit PU to transform it into the unbalance influence coefficient $EFK_U$. In a simple example of an elongated paper roller on a balancing machine the following relationship between the force influence coefficient $EFK_F = \alpha_{ij}^F$ applies and the unbalance influence coefficient applies $EFK_U = \alpha_{ij}^U$ applies $\alpha_{ij}^U(\Omega) = \Omega^2 \alpha_{ij}^F(\Omega)$.

Step 4

Measuring the force curve as a function of the r.p.m. in the left bearing plane $ME_1$ and in the right bearing plane MEG.

Step 5

Determining the weights that are required for a balancing operation and their angular position for an unbalance compensation in the three planes $WE_1$, $WE_2$ and $WE_3$ by a matrix operation. Finally, these weights are secured to the rotor which is now balanced.

The practical use of the present invention is particularly advantageous in connection with the balancing of relatively long paper and film or foil take-up rollers, rotors of all sorts as are used in the processing industries, rotors in electrical machines, etc.

Another advantage of the invention is seen in the fact that measurements taken even in only one of the two planes $ME_1$ and $ME_2$ yield results that are satisfactory for many practical purposes.

List of Symbols $^{ges}$=expression relates to all or total respective spectra $F_{1U}^{ges}$=total unbalance force spectra measured in the $ME_1$=first measuring plane [in Newton] (also bearing plane)

$F_{2U}$=unbalance force spectra measured in the $ME_2$=second measuring plane in [Newton] (also bearing plane)

$ME_i$=i-th bearing plane

U=unbalance [kg m] in the unbalance plane $\Omega$=angular frequency [radian/sec]

$WE_1$, $WE_2$, $WE_3$=unbalance plane also balancing plane or excitation force application plane $WE_j$=j-th excitation force application plane L=spacing [m] or distance between $ME_1$ and $ME_2$ x=spacing [m] between $ME_1$ and $WE_1$, $WE_2$, $WE_3$ $\psi_i(x)$=i-th modal shape [dimensionless]

$\omega_i$=i-th resonance angular frequency [radian/sec]

$\delta_i$=modal decay constant of i-th modal shape [1/sec] excitation force amplitude decays as a function of time $e^{-\delta_i t}$ $m_{geni}$=modal system mass of the i-th modal shape or generalized system mass [kg]

$m_{1/2}^{ei}$=modal specific replacement mass of the i-th modal mass [kg], related to first or second pedestal ei=indicating a quantity going along with i-th elastic (or flexible) modal shape $F_{IF}^{ges}$=total excitation force spectra measured in the first measuring plane (also bearing plane) [in Newton]

$F_{2F}^{ges}$=total excitation force spectra measured in the second measuring plane (also bearing plane) [N]

$EFK_F=\alpha_{ij}^F(n)$=excitation force influence coefficient calculated as the ratio of the force spectra at the i-th measuring plane $ME_1$ to the force spectra at the j-th excitation force application plane $EFK_U=\alpha_{ij}^U(n)$ unbalance force influence coefficient $EFK_U=\Omega^2 EFK_F$ or $\alpha_{ij}^U=\Omega^2 \Omega_{ij}^F$

*=conjugated complex values Example: (a+ib)* → (a−ib)

T=designates transposed matrix Example:

$$\begin{bmatrix} a & b \\ c & d \end{bmatrix} \begin{bmatrix} a & c \\ b & d \end{bmatrix}$$

$\underline{A}$=matrix A with complex magnitudes or values $\vec{F}$=complex forces occurring in the bearing or support or measuring planes in response to unbalance excitation dependent on the r.p.m.

n; $n_1$, $n_2$ . . . =r.p.m.s of the rotor $\vec{U}$=vector of the unbalance compensating weights required in the balancing planes $WE_1$, . . .

j=j-th value measured in unbalance planes $WE_1$, . . . (in the present example j=1, 2, 3)

i=i-th value measured in measuring plane $ME_1$, . . . (in the present example i=1, 2)

F=as an index identifies excitation force influence coefficients.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for obtaining unbalance compensating values from a rotor having a rotation axis and an r.p.m. dependent elastic or rigid behavior, for balancing said rotor, said method comprising the following steps:
   a) mounting said rotor in at least two bearing planes for rotating said rotor about said rotation axis,
   b) determining a number of balancing planes required by said rotor and a number of modal shapes which have to be balanced,
   c) applying an excitation force to said rotor transversely to said rotation axis in each of said balancing planes for inducing in said rotor a vibration pattern,
   d) sensing an excitation force spectrum or spectra caused by said excitation force that induced said vibration pattern,
   e) picking-up a rotor specific response spectrum or spectra,
   f) calculating ratios of said response spectrum or spectra to said excitation force spectrum or spectra for forming force influence coefficients ($EFK_F$) resulting from said excitation force,
   g) forming unbalance influence coefficients ($EFK_U$) from said force influence coefficients ($EFK_F$),
   h) performing a measuring sequence for measuring rotor r.p.m. signals and rotor specific signals,
   i) correlating said rotor specific signals to said respective rotor r.p.m. signals for producing r.p.m. correlated rotor specific signals, and
   j) calculating said unbalance compensating values from said r.p.m. correlated rotor specific signals and from said unbalance influence coefficients ($EFK_U$).

2. The method of claim 1, wherein said step of calculating comprises:
   a) forming an equation system of said unbalance compensating values, and
   b) solving said equation system in accordance with the least squares method.

3. The method of claim 1, further comprising:
   a) determining a first r.p.m. range in which said rotor is rigid,
   b) ascertaining at least one further r.p.m. range in which said rotor exhibits elastic deflections, and
   c) performing said measuring sequence in said first and said at least one further r.p.m. ranges.

4. The method of claim 3, further comprising ascertaining a plurality of n-further r.p.m. ranges in which said rotor exhibits elastic deflections, and performing said measuring sequence in each of said n-further r.p.m. ranges.

5. The method of claim 1, wherein said step of picking-up said rotor specific response spectrum or spectra is performed in at least one of said at least two bearing planes.

6. The method of claim 1, wherein said rotor specific response spectrum or spectra are force spectra.

7. The method of claim 1, wherein said rotor specific response spectrum or spectra are vibration spectra.

8. The method of claim 1, wherein said r.p.m. correlated rotor specific signals are force signals.

9. The method of claim 1, wherein said r.p.m. correlated rotor specific signals are vibration signals.

10. The method of claim 1, wherein said step of picking-up and said measuring sequence are performed in at least one of said at least two bearing planes ($ME_1$; $ME_2$).

11. The method of claim 1, wherein said number balancing planes is n+2 wherein n is the number of modal shape which have to be balanced.

12. The method of claim 1, wherein said step of applying an excitation force is performed mechanically by applying hammer blows to said rotor.

13. The method of claim 1, further comprising rotating said rotor and applying said excitation force while said rotor is rotating.

14. A method for obtaining unbalance influence coefficients for balancing a rotor having a rotation axis and an r.p.m. dependent elastic or rigid behavior, said method comprising the following steps:
   a) mounting said rotor in at least two bearing planes for rotating said rotor about said rotation axis,
   b) determining a number of balancing planes required by said rotor and a number of modal shapes which have to be balanced,
   c) applying an excitation force to said rotor transversely to said rotation axis in each of said balancing planes for inducing in said rotor a vibration pattern,
   d) sensing an excitation force spectrum or spectra caused by said excitation force that induced said vibration pattern,
   e) picking-up a rotor specific response spectrum or spectra, and
   f) calculating ratios of said response spectrum or response spectra to said excitation force spectrum or spectra to form said unbalance influence coefficients by transformation.

15. The method of claim 14, further comprising providing modal parameters, determining an influence that said modal parameters have on a characteristic curve of said unbalance influence coefficients, and taking said modal parameters into account when calculating said ratios.

16. The method of claim 14, wherein said step of determining said influence of said modal parameters is performed by modal analysis.

17. The method of claim 14, wherein said step of applying an excitation force is performed mechanically by introducing a mechanical excitation force in a direction corresponding to a sensing direction of a sensor performing said sensing step d).

18. The method of claim 14, further comprising rotating said rotor and applying said excitation force while said rotor is rotating.

19. The method of claim 14, wherein said step of picking-up said rotor specific response spectrum or spectra is performed in said at least two bearing planes.

20. The method of claim 14, wherein said rotor specific response spectrum or spectra are force spectra.

21. The method of claim 14, wherein said rotor specific response spectrum or spectra are vibration spectra.

22. The method of claim 14, wherein said number of balancing planes is n+2 wherein n is the number of modal shape at which said rotor has to be balanced.

23. The method at claim 14, wherein said step of applying an excitation force is performed mechanically by applying hammer blows to said rotor and sensing with a sensor in said hammer.

* * * * *

UNITED STATES PATENT AND TRADEMARK OFFICE
CERTIFICATE OF CORRECTION

PATENT NO. : 6,415,661 B1
DATED : July 9, 2002
INVENTOR(S) : Wiese

It is certified that error appears in the above-identified patent and that said Letters Patent is hereby corrected as shown below:

Column 10,
Line 13, after "coefficient", replace "EFK," by -- $EFK_F$ --;
Line 40, after "total", replace unbalance force" by -- unbalance force --.
Line 56, before "modal", replace "$\psi_i(x)$=i-th" by -- $\varphi_i(x)$=i-th --.

Column 11,
Line 7, after "plane", replace "$ME_1$" by -- $ME_i$ --;

Column 12,
Line 38, after "number", insert -- of --;
Line 39, after "modal", replace "shape" by -- shapes at --;
Line 40, after "which", replace "have" by -- said rotor has --;
Line 54, before "rotor", replace "said" by -- the --.

Column 14,
Line 14, after "hammer", insert -- said excitation force spectrum --.

Signed and Sealed this

Fifth Day of November, 2002

Attest:

*Attesting Officer*

JAMES E. ROGAN
*Director of the United States Patent and Trademark Office*